United States Patent
Yang et al.

(10) Patent No.: US 9,253,770 B2
(45) Date of Patent: *Feb. 2, 2016

(54) METHOD FOR ALLOCATING A CONTROL CHANNEL AND APPARATUS THEREFOR

(75) Inventors: Suckchel Yang, Anyang-si (KR); Joonkui Ahn, Anyang-si (KR); Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 119 days.

This patent is subject to a terminal disclaimer.

(21) Appl. No.: 14/122,978

(22) PCT Filed: Aug. 20, 2012

(86) PCT No.: PCT/KR2012/006587
§ 371 (c)(1),
(2), (4) Date: Nov. 27, 2013

(87) PCT Pub. No.: WO2013/025086
PCT Pub. Date: Feb. 21, 2013

(65) Prior Publication Data
US 2014/0105154 A1    Apr. 17, 2014

Related U.S. Application Data

(60) Provisional application No. 61/588,663, filed on Jan. 20, 2012, provisional application No. 61/524,773, filed on Aug. 18, 2011.

(30) Foreign Application Priority Data

Aug. 20, 2012 (KR) .................. 10-2012-0090470

(51) Int. Cl.
*H04W 72/04* (2009.01)
*H04W 88/04* (2009.01)
*H04L 5/00* (2006.01)

(52) U.S. Cl.
CPC .......... *H04W 72/042* (2013.01); *H04L 5/0053* (2013.01); *H04W 72/0453* (2013.01); *H04W 88/04* (2013.01); *H04L 5/001* (2013.01)

(58) Field of Classification Search
CPC .......... H04W 72/042; H04W 72/0453; H04W 88/04; H04L 5/0053; H04L 5/001
See application file for complete search history.

(56) References Cited

U.S. PATENT DOCUMENTS

| | | | |
|---|---|---|---|
| 8,687,584 B2 * | 4/2014 | Yang et al. ............... | 370/329 |
| 2010/0159938 A1 | 6/2010 | Shin et al. | |
| 2010/0254268 A1 | 10/2010 | Kim et al. | |
| 2010/0290418 A1 | 11/2010 | Nishio et al. | |

FOREIGN PATENT DOCUMENTS

| | | |
|---|---|---|
| KR | 10-2010-0071828 A | 6/2010 |
| KR | 10-2010-0110272 A | 10/2010 |
| WO | 2009/087742 A1 | 7/2009 |

OTHER PUBLICATIONS

LG Electronics, "Correction to handling of search space overlap," 3GPP TSG-RAN WG1 Meeting #65, May 9-13, 2011, R1-111890.

* cited by examiner

*Primary Examiner* — Mohammad Anwar
(74) *Attorney, Agent, or Firm* — Birch, Stewart, Kolasch & Birch, LLP

(57) ABSTRACT

The present invention relates to a wireless communication system. More particularly, the present invention relates to a method in which a terminal performs a process for determining a control channel allocation for a control channel, and to an apparatus for the method. The method comprises the steps of: monitoring, on a specific carrier, a common search space including a control channel candidate set for the control channel; and monitoring, on the specific carrier, a terminal-specific search space including the control channel candidate set for the control channel. In cases where the terminal is set to monitor a plurality of control channel candidates having the same radio network temporary identifier (RNTI), same information size, same first control channel resource, and same control channel resource aggregation level in the common search space and the terminal-specific search space, the control channel candidate that satisfies the above conditions is received only in the common search space.

14 Claims, 19 Drawing Sheets

* if common search space and UE-specific search space overlap each other and prescribed condition is satisfied, UE-specific search space is monitored under assumption that control channel transmission is restricted in at least part of control channel candidates \* if common search space and UE-specific search space overlap each other and prescribed condition is satisfied, at least part of control channel candidates is restricted to be transmitted in UE-specific search space

FIG. 16

|  | L-PDCCH region | E-PDCCH region | possibility of confusion |
|---|---|---|---|
| Case 0 | CSS, USS | - | O |
| Case 1 | CSS | USS | X |
| Case 2 | - | CSS, USS | O |

FIG. 17
if CCE aggregation level is identified (e.g., CCE aggregation level based mapping)
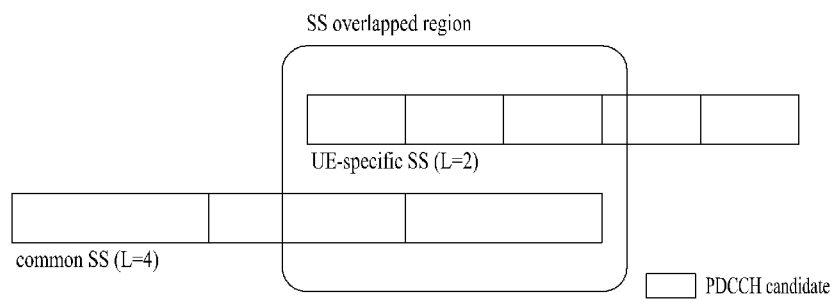
(a) start CCEs overlap each other and CCE aggregation level is different from each other: no possibility of confusion
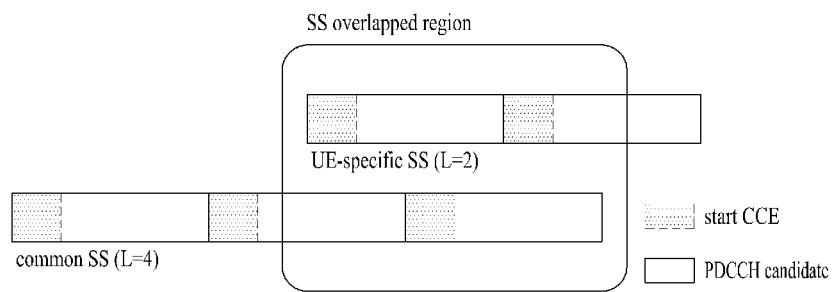
(b) CCE aggregation levels are identical to each other and start CCE is different from each other: no possibility of confusion

METHOD FOR ALLOCATING A CONTROL CHANNEL AND APPARATUS THEREFOR

CROSS REFERENCE TO RELATED APPLICATIONS

This application is the National Phase of PCT/KR2012/006587 filed on Aug. 20, 2012, which claims priority under 35 U.S.C. 119(e) to U.S. Provisional Application No. 61/524,773 filed on Aug. 18, 2011 and U.S. Provisional Application No. 61/588,663 filed on Jan. 20, 2012 and under 35 U.S.C. 119(a) to Patent Application No. 10-2012-0090470 filed in the Republic of Korea on Aug. 20, 2012, all of which are hereby expressly incorporated by reference into the present application.

TECHNICAL FIELD

The present invention relates to a wireless communication system, and more particularly, to a method of assigning a control channel and an apparatus therefor.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE OF THE INVENTION

Technical Tasks

One object of the present invention is to provide a method of efficiently assigning a control channel in a single/multi carrier wireless communication system and an apparatus therefor. Another object of the present invention is to provide a method of eliminating ambiguity/blocking capable of being occurred in case that a control channel is assigned and an apparatus therefor. A third object of the present invention is to provide a method of efficiently performing a blind detection of a control channel and an apparatus therefor. The other object of the present invention is to provide a method of configuring a search space to efficiently transmit a control channel and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of performing a process of determining a control channel assignment for a control channel, which is performed by a user equipment in a wireless communication system includes the steps of monitoring a common search space including a control channel candidate set for the control channel on a specific carrier and monitoring a user equipment-specific search space including the control channel candidate set for the control channel on the specific carrier, wherein if the user equipment is configured to monitor a plurality of control channel candidates having an identical RNTI (radio network temporary identifier), an identical information size, an identical first control channel resource, and an identical control channel resource aggregation level in the common search space and the user equipment-specific search space, the control channel candidates are received in the common search space only.

To further achieve these and other advantages and in accordance with the purpose of the present invention, according to a different embodiment, a user equipment configured to perform a process of determining a control channel assignment for a control channel in a wireless communication system includes a radio frequency (RF) unit and a processor, the processor configured to monitor a common search space including a control channel candidate set for the control channel on a specific carrier, the processor configured to monitor a user equipment-specific search space including the control channel candidate set for the control channel on the specific carrier, wherein if the user equipment is configured to monitor a plurality of control channel candidates having an identical RNTI (radio network temporary identifier), an identical information size, an identical first control channel resource, and an identical control channel resource aggregation level in the common search space and the user equipment-specific search space, the control channel candidates are received in the common search space only.

Preferably, the control channel is received in the common search space only for a plurality of the control channel candidates only.

Preferably, if the control channel is detected on the plurality of the control channel candidates, the control channel is considered to be received in the common search space.

Preferably, monitoring the plurality of the control channel candidates is performed under an assumption that the control channel is received in the common search space only.

Preferably, a CRC (cyclic redundancy check) is scrambled with the identical RNTI for the plurality of the control channel candidates.

Preferably, the information size corresponds to a DCI (downlink control information) payload size.

Preferably, the control channel corresponds to PDCCH (physical downlink control channel) and the control channel candidates correspond to PDCCH candidates.

Advantageous Effects

According to the present invention, a control channel can be efficiently assigned in a single/multi carrier wireless communication system, a blind detection of a control channel can be efficiently performed, and a search space can be efficiently configured.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 16 is a diagram of an example of distributing a search space (SS).

FIG. 17 is a diagram for an example that control channel confusion does not occur in E-PDCCH (enhanced physical downlink control channel) region;

BEST MODE

Mode for Invention

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP LTE system or 3GPP LTE-A system, by which the technical idea of the present invention may be non-limited. Specific terminologies used in the following description are provided to help understand the present invention and the use of the terminologies can be modified to a different form within a scope of the technical idea of the present invention.

Figure 1:
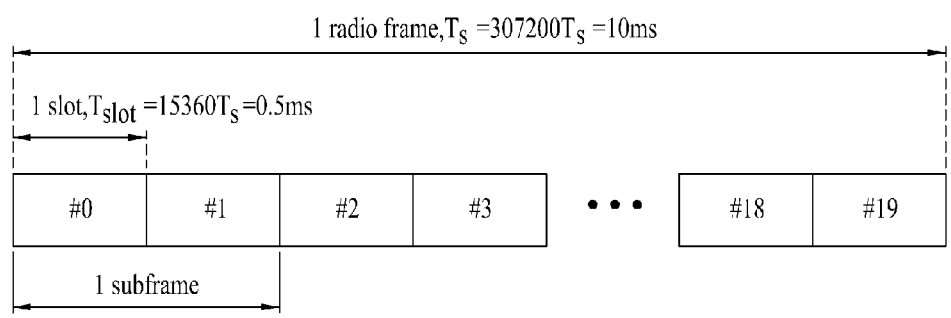
FIG. 1 is a diagram for an example of a radio frame structure of 3GPP system.

FIG. 1 is a diagram for an example of a radio frame structure of 3GPP system.

Referring to FIG. 1, A radio frame includes 10 subframes. Each of the subframes includes 2 slots in time domain. A time taken to transmit one subframe is defined as a transmission time interval (hereinafter abbreviated TTI). For instance, one subframe may have a length of 1 ms and one slot may have a length of 0.5 ms. One slot may include a plurality of OFDM symbols or SC-FDMA (single carrier frequency division multiple access) symbol in time domain. Since 3GPP LTE system uses OFDMA in downlink and SC-FDMA in uplink, OFDM or SC-FDMA symbol indicates one symbol period. Resource block (RB) is a resource allocation unit and may include a plurality of contiguous subcarriers in one slot. The above-described structures of the radio frame are exemplary only. And, the number of subframes included in a radio frame, the number of slots included in the subframe and the number of symbols included in the slot may be modified in various ways.

Figure 2:
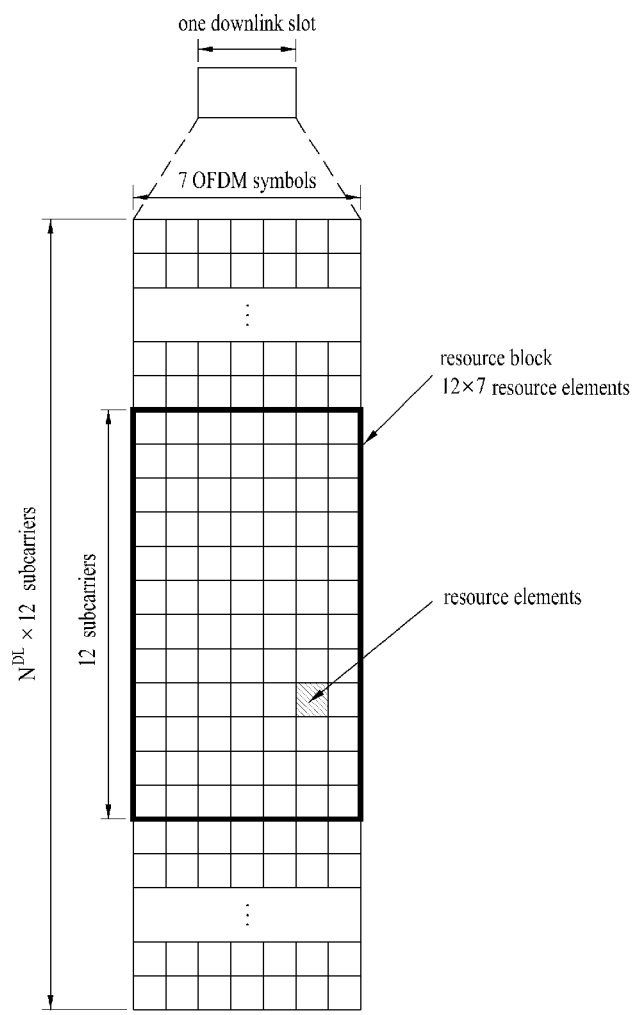
FIG. 2 is a diagram for an example of a resource grid for a downlink slot.

FIG. 2 is a diagram for an example of a resource grid for a downlink slot.

Referring to FIG. 2, one downlink (DL) slot may include a plurality of OFDM symbols in time domain. In particular, one DL slot exemplarily includes 7(6) OFDM symbols and one resource block (RB) includes 12 subcarriers in frequency domain. Each element on a resource grid is called a resource element (hereinafter abbreviated RE). One resource block includes 12×7(6) resource elements. The number $N_{DL}$ of resource blocks included in a DL slot may depend on a DL transmission bandwidth. And, the structure of an uplink (UL) slot may be identical to that of the DL slot and OFDM symbol is replaced by SC-FDMA symbol.

Figure 3:
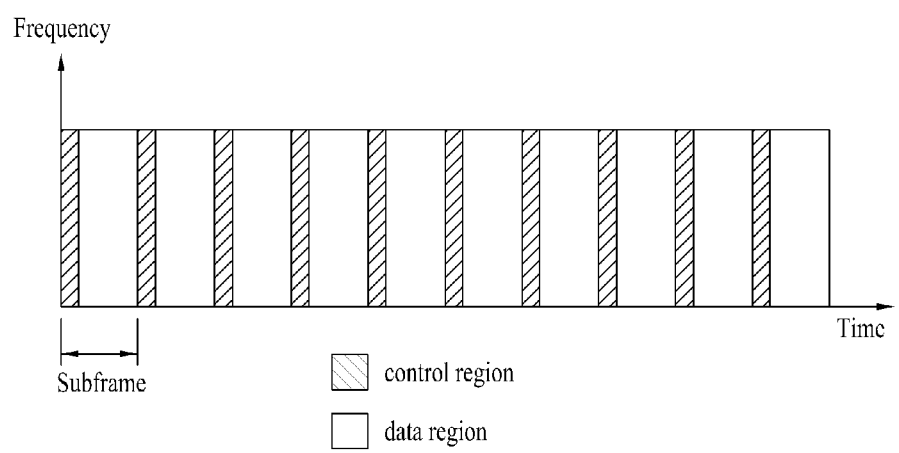
FIG. 3 is a diagram for an example of a structure of a downlink frame.

FIG. 3 is a diagram for an example of a structure of a downlink subframe.

Referring to FIG. 3, maximum 3 (4) OFDM symbols situated at a fore part of a first slot of one subframe correspond to a control region to which control channels are assigned. The rest of OFDM symbols correspond to a data region to which PDSCH (physical downlink shared channel) is assigned. Examples of DL control channels used by 3GPP LTE may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and carries information on the number of OFDM symbols used for a transmission of a control channel within the subframe. The PHICH is a response channel in response to UL and carries ACK/NACK (acknowledgement/non-acknowledgement) signal for HARQ (hybrid automatic repeat request).

Control information carried on PDCCH may be called downlink control information (hereinafter abbreviated DCI). The DCI includes resource allocation information for a UE or a UE group and different control information. For instance, the DCI includes UL/DL scheduling information, UL transmit (Tx) power control command, and the like.

Control information carried on PDCCH may be called downlink control information (DCI: downlink control indicator). A DCI format is defined by a format of 0, 3, 3A, 4 for an uplink and the DCI format is defined by formats of 1, 1A, 1B, 1C, 1D, 2, 2A, 2B, 2C and the like for a downlink. A type of information field, the number of information field, the number of bit of each information field and the like vary according to a DCI format. For instance, the DCI format may be able to selectively include a hopping flag, an RB assignment, an MCS (modulation coding scheme), an RV (redundancy version), an NDI (new data indicator), a TPC (transmit power control), a HARQ process number, a PMI (precoding matrix indicator) confirmation and the like according to a usage. Hence, a size of control information matched with a DCI format varies according to the DCI format. Meanwhile, an arbitrary DCI format can be used to transmit control information of two or more types. For instance, the DCI format 0/1A is used to carry the DCI format 0 or the DCI format 1. The DCI format 0 and the DCI format 1 are distinguished by a flag field.

PDCCH carries a transmission format and resource allocation information of DL-SCH (downlink shared channel), a transmission format and resource allocation information of UL-SCH (uplink shared channel), paging information on a PCH (paging channel), system information on a DL-SCH, resource allocation information of an upper layer control message such as a random access response transmitted on PDSCH, a transmit power control command set for an individual user equipments within a random user equipment (UE) group, information on activation indication of VoIP (voice over IP), and the like. A plurality of PDCCHs can be transmitted in a control region and a user equipment is able to monitor a plurality of the PDCCHs. PDCCH is configured with the aggregation of at least one or more contiguous CCEs (control channel elements). CCE is a logical assignment unit used to provide PDCCH with a code rate in accordance with a state of a radio channel. CCE corresponds to a plurality of REGs (resource element groups). A format of PDCCH and the number of bits of an available PDCCH are determined according to correlation between the number of CCEs and a code rate provided by the CCE. A base station determines a PDCCH format in accordance with DCI to be transmitted to a user equipment and attaches a CRC (cyclic redundancy check) to control information. The CRC is masked with a unique identifier (e.g., RNTI (radio network temporary identifier)) in accordance with an owner or usage of PDCCH. If PDCCH is provided for a specific user equipment, the CRC can be masked with a unique identifier of the corresponding user equipment, i.e., C-RNTI (i.e., Cell-RNTI). If PDCCH is provided for a paging message, the CRC can be masked with a paging identifier (e.g., P-RNTI (Paging-RNTI)). If PDCCH is provided for system information, and more particularly, for a system information block (SIB), the CRC can be masked with a system information identifier (e.g., SI-RNTI (system information-RNTI). If PDCCH is provided for a random access response, the CRC can be masked with RA-RNTI (random access-RNTI).

PDCCH carries a message known as a DCI (downlink control information) and the DCI includes resource allocation information for a UE or a UE group and different control information. In general, a plurality of PDCCHs can be transmitted in a subframe. Each of a plurality of the PDCCHs is transmitted using one or more CCEs (control channel element). In this case, the CCE means a unit corresponding to 9 sets of REGs each of which is configured with 4 resource elements. And, 4 QPSK (quadrature phase shift keying) symbols are mapped to each of the REGs. Resource elements occupied by RS (reference signal) are not included in the REG In particular, the total number of REGs in OFDM symbol may vary depending on whether a cell-specific reference signal exists. The concept of REG for mapping 4 resource elements to one group may apply to other DL control channels (e.g., PCFICH, PHICH, etc.). In particular, the REG is used as a basic resource unit of the control region. Table 1 shows PDCCH format, in which 4 kinds of PDCCH formats are supported.

TABLE 1

| PDCCH format | Number of CCEs (n) | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

CCEs are contiguously used in a manner of being indexed. In order to simplify a decoding process, PDCCH including a format configured with n CCEs may start with CCE having an index equal to the multiple of n. The number of CCEs used for a transmission of a specific PDCCH is determined by a base station in accordance with a channel state. For instance, a single CCE may be sufficient for a PDCCH provided for a user equipment having a good DL channel state (e.g., a case that the user equipment is located in the vicinity of a base station). On the other hand, in case of PDCCH provided for a user equipment having a poor channel state (e.g., a case that the user equipment is located on a cell edge or boundary), 8 CCEs may be required for sufficient robustness. Besides, a power level of PDCCH may be adjusted in a manner of being matched to the channel state.

LTE defines a CCE set where PDCCH is able to be positioned for each of the user equipments. The CCE set for which a user equipment is able to search its own PDCCH is called a PDCCH search space, simply a search space (SS). An individual resource to which PDCCH is able to be transmitted thereto within the SS is called a PDCCH candidate. One PDCCH candidate corresponds to 1, 2, 4, or 8 CCEs according to a CCE aggregation level. A base station transmits an actual PDCCH (DCI) via an arbitrary PDCCH candidate within the SS and a user equipment monitors the SS to find out the PDCCH (DCI). Specifically, the user equipment attempts a blind decoding (BD) for PDCCH candidates within the SS.

In LTE system, the SS may have a different size in accordance with each PDCCH format. And, a USS (UE-specific search space) and a CSS (common search space) are separately defined. The USS is also called a dedicated search space. The UE-specific search space may be individually set for each of user equipments and a range of the common search space is known to all user equipments. The UE-specific and the common search space can be overlapped for a given user equipment. If all CCEs are already allocated to different user equipments in the USS, which is configured for a specific UE, since there is no remaining CCE, a base station may not find out CCE resources enough to transmit PDCCH to the specific user equipment in a given subframe. In order to minimize this blocking that may be kept in a next subframe, a start point of the UE-specific search space is modified by a UE-specific hopping sequence in every subframe. Table 2 shows sizes of a common search space and a UE-specific search space.

TABLE 2

| PDCCH format | Number of CCEs (n) | Number of PDCCH candidates in Common | Number of PDCCH candidates in UE-specific |
|---|---|---|---|
| 0 | 1 | — | 6 |
| 1 | 2 | — | 6 |
| 2 | 4 | 4 | 2 |
| 3 | 8 | 2 | 2 |

In order to reduce a calculation load of a user equipment due to a blind decoding (BD) attempt count, the user equipment does not perform searches in accordance with all the defined DCI formats at the same time. In general, the user equipment always searches a UE-search space for DCI format 0 and DCI format 1A. The DCI format 0 and the DCI format 1A are equal to each other in size and may be identified by a flag included in a message. And, the user equipment may be requested to receive an additional format, e.g., format 1, 1B, or 2 according to the PDSCH transmission mode set by a base station. The user equipment may be able to search a common search space for DCI format 1A and DCI format 1C. The user equipment may be configured to search DCI format 3 or DCI format 3A. Similar to the DCI format 0 and the DCI format 1A, the DCI format 3 and the DCI format 3A are equal to each other in size and the user equipment may be able to identify a DCI format using CRC scrambled by different identifiers (common identifier). A transmission mode to configure multi-antenna technology and content of DCI formats are described in the following.

Figure 4:
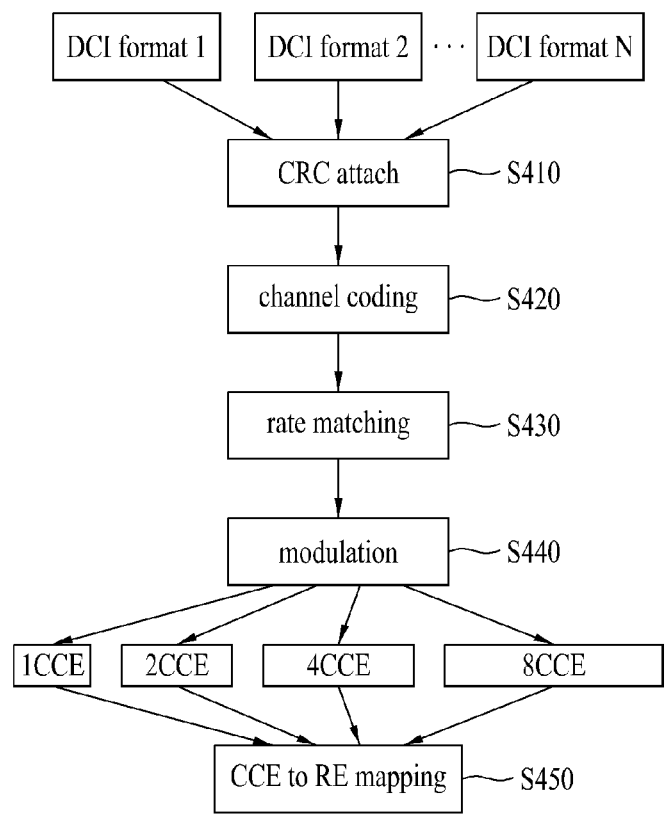
FIG. 4 is an exemplary flowchart of PDCCH (physical downlink control channel) configuration performed by a base station.

Transmission Mode (TM)
Transmission mode 1: transmission from a single base station antenna port
Transmission mode 2: transmit diversity
Transmission mode 3: open-loop spatial multiplexing
Transmission mode 4: closed-loop spatial multiplexing
Transmission mode 5: multi-user MIMO
Transmission mode 6: closed-loop rank-1 precoding
Transmission mode 7: transmission using UE-specific reference signals
DCI Format
Format 0: resource grants for the PUSCH transmissions (uplink)
Format 1: resource assignments for single codeword PDSCH transmissions (transmission modes 1, 2 and 7)
Format 1A: compact signaling of resource assignments for single codeword PDSCH (all modes)
Format 1B: compact resource assignments for PDSCH using rank-1 closed loop precoding (mode 6)
Format 1C: very compact resource assignments for PDSCH (e.g. paging/broadcast system information)
Format 1D: compact resource assignments for PDSCH using multi-user MIMO (mode 5)
Format 2: resource assignments for PDSCH for closed-loop MIMO operation (mode 4)
Format 2A: resource assignments for PDSCH for open-loop MIMO operation (mode 3)
Format 3/3A: power control commands for PUCCH and PUSCH with 2-bit/1-bit power adjustment FIG. 4 is a flowchart of PDCCH (physical downlink control channel) configuration performed by a base station.

Referring to FIG. 4, a base station generates control information according to a DCI format. The base station may be able to select one DCI format among a plurality of DCI formats (DCI format 1, 2, . . . , N) according to the control information to be transmitted to a user equipment. A CRC (cyclic redundancy check) used for detecting an error is attached to the control information generated according to each of the DCI formats [S410]. The CRC is masked with an identifier (e.g., RNTI (radio network temporary identifier)) in accordance with an owner or usage of PDCCH. In other word, PDCCH is CRC scrambled with the identifier (e.g., RNTI).

Table 3 shows an example of identifiers masked to PDCCH.

TABLE 3

| Type | Identifier | Description |
|---|---|---|
| UE-specific | C-RNTI, temporary C-RNTI, semi-persistent C-RNTI | Used for a unique UE identification |
| Common | P-RNTI | Used for paging message |
| | SI-RNTI | Used for system information |
| | RA-RNTI | Used for random access response |

In case that a C-RNTI, a temporary C-RNTI, or a semi-persistent C-RNTI is used, PDCCH carries control information for corresponding specific user equipment. In case that the rest of RNTI is used, the PDCCH carries common control information by which all user equipments within a cell receive. A base station creates a coded data (codeword) by performing a channel coding on the CRC attached control information [S420]. The base station performs a rate matching in accordance with a CCE aggregation level assigned to a PDCCH format [S430] and generates modulated symbols by modulating the coded data [S440]. The modulated symbols configuring one PDCCH may have a CCE aggregation level set to one of 1, 2, 4 and 8. Thereafter, the base station maps the modulated symbols to physical resource elements (RE), i.e., CCE to RE mapping [S450].

Figure 5:
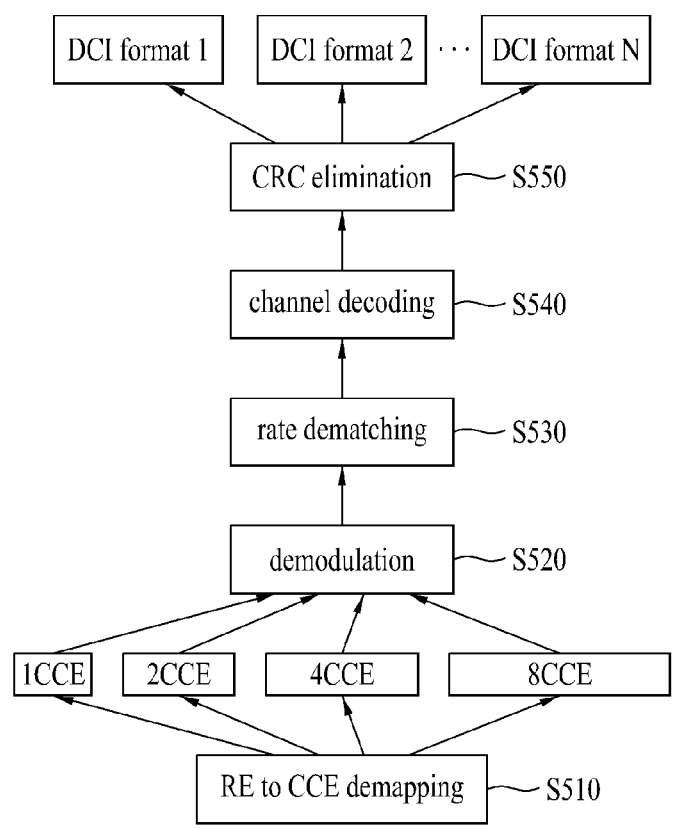
FIG. 5 is a flowchart for explaining an example of PDCCH processing process of a user equipment.

FIG. 5 is a flowchart for explaining an example of PDCCH processing process of a user equipment.

Referring to FIG. 5, a user equipments de-maps a physical resource element to CCE, i.e., RE to CCE demapping [S510]. Since the user equipment does not know which CCE aggregation level should be used to receive PDCCH, the user equipment demodulates each of the CCE aggregation levels [S520]. The user equipment performs a rate dematching in accordance with the demodulated data. Since the user equipment does not know which DCI format (or DCI payload size)-having control information should be received, the user equipment performs a rate de-matching in accordance with each of the DCI formats (or DCI payload size) [S530]. The user equipment performs a channel decoding on the de-matched data according to a code rate, checks a CRC, and then detects whether there is an error [S540]. If an error does not occur, it indicates that the user equipment has found out the PDCCH for its own. If an error occurs, the user equipment continuously performs a blind decoding on a different CCE aggregation level or a different DCI format (or DCI payload size). The user equipment, which has found out the PDCCH of its own, eliminates the CRC from the decoded data and then obtains control information.

A plurality of PDCCHs for a plurality of user equipments can be transmitted within a control region of an identical subframe. A base station does not provide information on where a corresponding PDCCH is situated within the control region to the user equipment. Hence, the user equipment searches the subframe for PDCCH for its own in a manner of monitoring a set of PDCCH candidates. In this case, the verb 'monitor' means that the user equipment attempts to decode each of the received PDCCH candidates in accordance with each of the PDCCH formats and each of the CCE aggregation levels. This is called a blind decoding (blind detection). By using the blind decoding, the user equipment simultaneously performs an identification of the PDCCH transmitted to the user equipment and a decoding of the control information transmitted on a corresponding PDCCH. For instance, if the PDCCH is de-masked with C-RNTI, if an error does not occur, it indicates that the user equipment has found out the PDCCH of its own.

Meanwhile, in order to reduce an overhead of blind decoding, the number of DCI formats is defined less than a kind of the control information transmitted on a PDCCH. The DCI format includes a plurality of information fields different from each other. According to the DCI format, a kind of the information field, the number of the information field, a bit number of each of the information fields and the like may vary. In particular, a size of the control information, which is matched with the DCI format, may vary according to the DCI format. A random DCI format can be used for transmitting 2 or more kinds of the control information.

Table 4 shows an example of control information transmitted by a DCI format 0. Bit size of each information field is just an exemplary and does not limit the bit size of each field.

TABLE 4

| Information Field | bit(s) |
| --- | --- |
| (1) Flag for format0/format1A differentiation | 1 |
| (2) Hopping flag | 1 |
| (3) Resource block assignment and hopping resource Allocation | $\lceil \log_2(N_{RB}^{UL}(N_{RB}^{UL}+1)/2) \rceil$ |
| (4) Modulation and coding scheme and redundancy Version | 5 |
| (5) New data indicator | 1 |
| (6) TPC command for scheduled PUSCH | 2 |
| (7) Cyclic shift for DM RS | 3 |
| (8) UL index (TDD) | 2 |
| (9) CQI request | 1 |

The flag field is an information filed for distinguishing the DCI format 0 and the DCI format 1. In particular, the DCI format 0 and the DCI format 1A have a same payload size and are categorized by the flag field. A resource block assignment and hopping resource allocation field may have a different bit size in accordance with a hopping PUSCH or a non-hopping PUSCH. The resource block assignment and hopping resource allocation field for the non-hopping PUSCH provides ceiling[$\log_2(N^{UL}_{RB}(N^{UL}_{RB}+1)/2)$] bit to allocate a resource to a first slot in an uplink subframe. In this case, $N^{UL}_{RB}$ indicates the number of resource blocks included in an uplink slot and depends on an uplink transmission bandwidth configured in a cell. Hence, a payload size of the DCI format 0 may vary according to the uplink bandwidth. The DCI format 1A includes an information field necessary for PDSCH assignment and a payload size of the DCI format 1A may also vary according to a downlink bandwidth. The DCI format 1A provides the DCI format 0 with a reference information bit size. Hence, if the number of information bits of the DCI format 0 is smaller than the number of information bits of the DCI format 1A, '0' is attached to the DCI format 0 until the payload size of the DCI format 0 becomes identical to the payload size of the DCI format 1A. A padding field of the DCI format is filled with the attached '0'.

Figure 6:
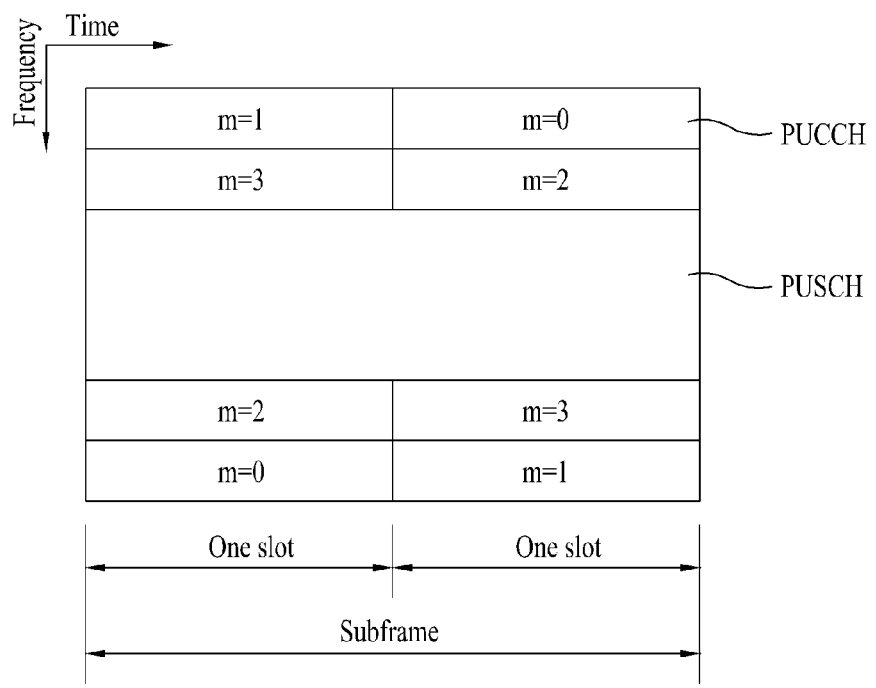
FIG. 6 is a diagram for an example of a structure of an uplink subframe.

FIG. 6 is a diagram for a structure of an uplink subframe.

Referring to FIG. 6, an uplink subframe includes a plurality of slots (e.g., 2 slots). A slot may include a different number of SC-FDMA symbols according to a length of CP. As one example, in case of a normal CP, a slot may include 7 SC-FDMA symbols. A UL subframe may be divided into a control region and a data region in frequency domain. The data region includes PUSCH and can be used for transmitting a data signal such as an audio and the like. The control region includes PUCCH and can be used for transmitting control information. The PUCCH includes a RB pair (e.g., m=0, 1, 2, 3) situated at the both ends of the data region and hops on a slot boundary. The control information includes a HARQ-ACK/NACK, a CQI (Channel Quality Information), a PMI (Precoding Matrix Indicator), an RI (Rank Indication), and the like.

Figure 7:
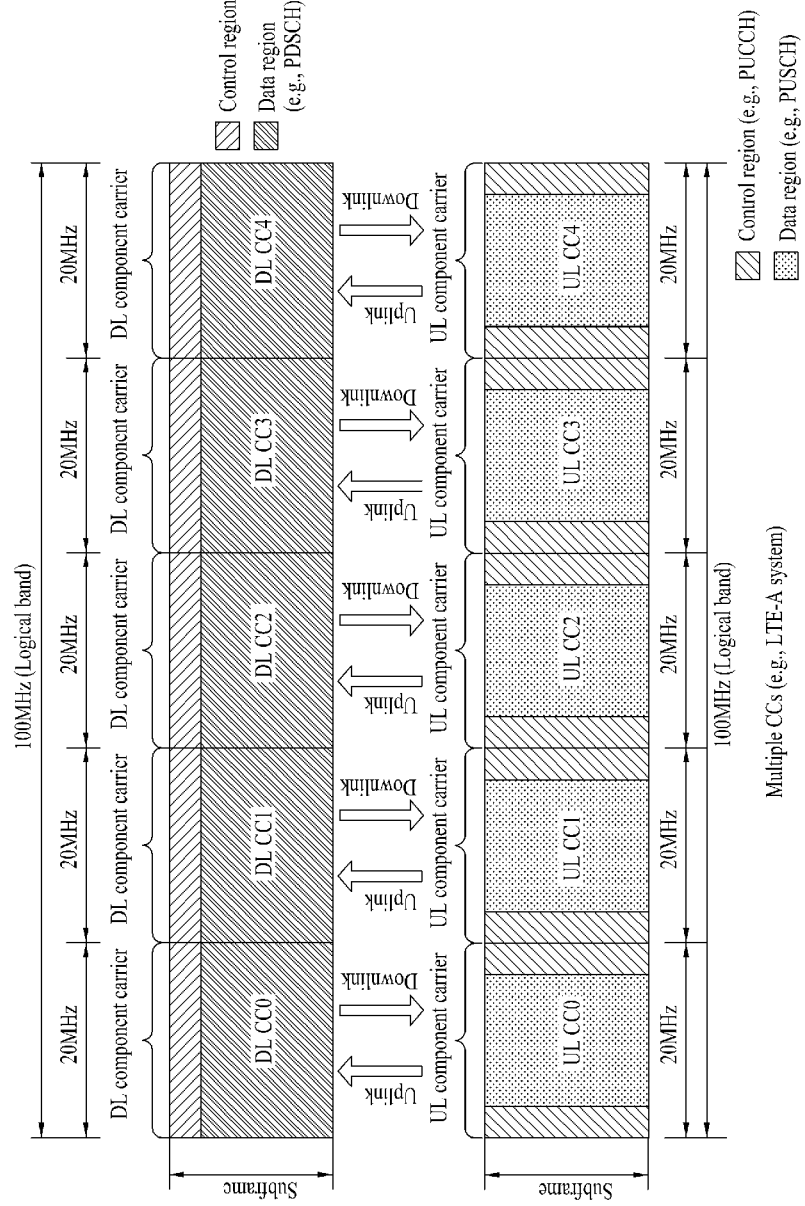
FIG. 7 is a diagram for an example of a carrier aggregation (CA) system.

FIG. 7 is a diagram for explaining an example of a carrier aggregation (CA) communication system.

Referring to FIG. 7, a wider UL/DL bandwidth can be supported in a manner of aggregating a plurality of UL/DL component carriers (CC). The terminology 'component carrier' can be replaced by such an equivalent terminology as a carrier, a cell, and the like. Each of the component carriers may be adjacent to each other or non-adjacent to each other in frequency domain. The bandwidth of each of the component carriers can be determined independently. An asymmetric carrier aggregation, which means that the number of downlink component carrier (DL CC) and the number of uplink component carrier (UL CC) are different from each other, is also possible. Meanwhile, control information can be set to be transceived on a specific CC only. The specific CC is called a primary CC and the rest of CCs may be called a secondary CC.

As one example, in case that a cross-carrier scheduling (or a cross-CC scheduling) is applied, PDCCH for DL assignment is transmitted on a DL CC #0 and a corresponding PDSCH can be transmitted on a DL CC #2. For a cross-CC scheduling, a CIF (carrier indicator field) can be used. Whether a CIF exists or not within a PDCCH can be semi-statically and user-specifically (or user group-specifically) configured via an upper layer signaling (e.g., RRC signaling). Basics of PDCCH transmission can be summarized as follows.

CIF disabled: PDCCH on DL CC allocates a PDSCH resource on the same DL CC or a PUSCH resource on a singly linked UL CC.
  No CIF
  Identical to LTE PDCCH structure (identical coding, identical CCE-based resource mapping) and DCI format CIF enabled: PDCCH on DL CC allocates a PDSCH or PUSCH resource on a specific DL/UL CC among a plurality of aggregated DL/UL CCs using a CIF.
  Expanded LTE DCI format including a CIF
  CIF (if configured) is a stationary x-bit field (e.g., x=3)
  CIF (if configured) position is fixed irrespective of a DCI format size
  Reuse of LTE PDCCH structure (identical coding, identical CCE-based resource mapping)

In case that a CIF exists within a PDCCH, a base station may be able to assign a PDCCH monitoring DL CC set to reduce BD complexity of a user equipment side. The PDCCH monitoring DL CC set is a part of aggregated whole DL CC and includes at least one DL CC. A user equipment may be able to perform a detection/decoding of the PDCCH on a corresponding DL CC only. In particular, for a scheduling of PDSCH/PUSCH, the base station may be able to transmit the PDCCH on the PDCCH monitoring DL CC only. The PDCCH monitoring DL CC set may be configured UE-specifically, UE group-specifically or cell-specifically. The terminology 'PDCCH monitoring DL CC' can be replaced by such an equivalent terminology as a monitoring carrier, a monitoring cell, and the like. And, a CC aggregated for a user equipment can be replaced by such an equivalent terminology as a serving CC, a serving carrier, a serving cell, and the like.

Figure 8:
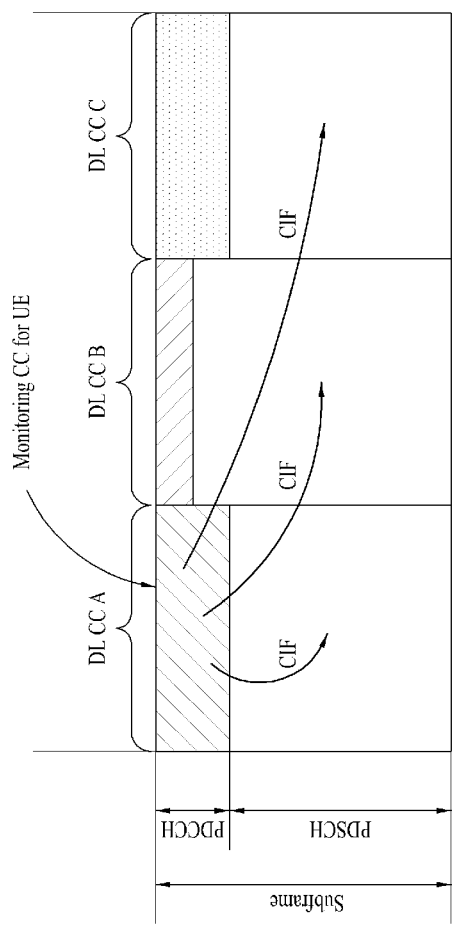
FIG. 8 is a diagram for an example of a scheduling in case that a plurality of carriers are aggregated.

FIG. 8 is a diagram for an example of a scheduling in case that a plurality of carriers are aggregated. Assume that 3 DL CCs are aggregated and a DL CC A is configured as a PDCCH monitoring DL CC. DL CC A~C can be called a serving CC, a serving carrier, a serving cell, and the like. If a CIF is disabled, each of DL CCs may be able to transmit PDCCH, which schedules PDSCH of each of the DL CCs, only without a CIF according to an LTE PDCCH rule. On the other hand, if a CIF is enabled by an (UE-group-specific or cell specific) upper layer signaling, only the DL CC A (monitoring DL CC) may be able to transmit the PDCCH, which schedules the PDSCH of a different DL CC as well as the PDSCH of the DL CC A using the CIF. In this case, PDCCH is not transmitted on DL CC B and DL CC C, which are not configured as the PDCCH monitoring DL CC. Hence, the DL CC A (monitoring DL CC) should include all of a PDCCH search space related to the DL CC A, a PDCCH search space related to the DL CC B, and a PDCCH search space related to the DL CC C. In the present specification, assume that a PDCCH search space is defined according to a carrier.

As mentioned in the foregoing description, LTE-A considers a use of a CIF in PDCCH to perform a cross-CC scheduling. Whether to use a CIF (i.e., supporting a cross-CC scheduling mode or a non-cross-CC scheduling mode) and switching between modes can be semi-statically/UE-specifically configured via an RRC signaling. After the RRC signaling process is underwent, a user equipment can recognize whether a CIF is used in PDCCH to be scheduled for the user equipment.

Figure 9:
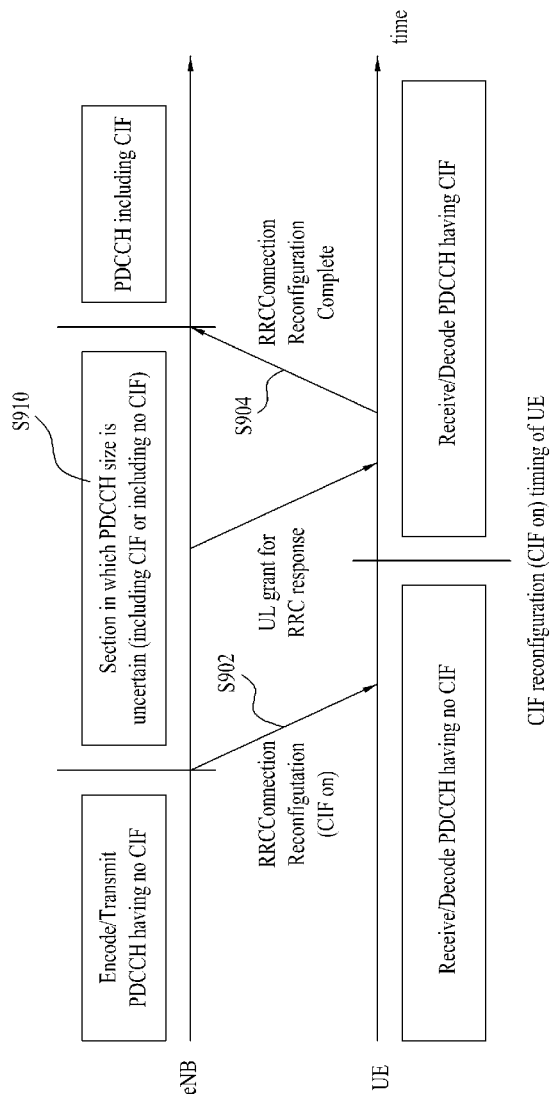
FIG. 9 is a diagram for an example of operations of base station/user equipment in a CIF reconfiguration period.

FIG. 9 is a diagram for an example of operations of base station/user equipment in a CIF reconfiguration period. A situation that CIF off is reconfigured to CIF on is assumed for FIG. 9.

Referring to FIG. 9, a base station transmits an RRC command (e.g., 'RCCconnectionReconfiguration' command) to a UE to configure whether a CIF is used (i.e., CIF ON/OFF) for the corresponding UE within PDCCH, i.e., to deliver a CIF reconfiguration message [S902]. The UE delivers the received RRC command to an RRC layer of the UE. The RRC layer of the UE transmits an RRC response (e.g., RRCCconnectionReconfigurationComlete' message) to the base station to deliver a CIF reconfiguration complete message in response to the RRC command received from the base station [S904].

Meanwhile, since a start timing of applying a CIF reconfiguration (i.e., CIF on/off) in an RRC signaling period 910 may be different from each other between a base station and a UE, an error may occur in a PDCCH transmission process of the base station and a reception/decoding process of the UE. In other word, there may exist possibility that the base station and the UE may differently recognize whether to use a CIF for a same PDCCH on a specific timing point in the RRC signaling period 910. For instance, while the base station transmits the PDCCH without a CIF, the UE may receive/decode the PDCCH under an assumption that the CIF is used. Moreover, while the base station transmits the PDCCH in a manner of inserting a CIF into the PDCCH, the UE can receive/decode the PDCCH without assuming a use of a CIF. This sort of error not only brings about an unnecessary overhead in transmitting/receiving PDCCH between the base station and the UE but also increases scheduling time delay.

In a conventional LTE, a UE periodically transmits an SRS (sounding reference signal) to inform a base station of uplink channel information and information for the SRS is configured via an RRC signaling. Yet, LTE-A can configure a scheme of dynamically triggering a non-periodic SRS transmission according to a CC via a DCI format configured in a UE-specific search space (USS) to adaptively measure an uplink channel. And, LTE-A considers a method of increasing the number of bits of a non-periodic CSI request field of a DCI format configured in a UE-specific search space (USS) to obtain more sufficient downlink channel information in a CC aggregation situation. Hence, when an RRC reconfiguration for the non-periodic SRS configuration or RRC reconfiguration for CC aggregation (single CC=>multiple CCs or multiple CCs=>single CC) is performed, an error related to PDCCH, which is similar to the aforementioned error, may occur. In particular, a base station and a UE may different recognize whether to use a non-periodic SRS request field, a size of a non-periodic CSI request field, and the like for a same PDCCH.

Embodiment: Method of Eliminating Ambiguity of a Detected Control Channel

In LTE-A, if a cross-CC scheduling operation is applied in a situation that a plurality of CCs are aggregated, a CIF is included in PDCCH transmitted via a USS. Yet, a CIF is not included in PDCCH transmitted via a CSS. In case of the CSS, the CIF is not included in the PDCCH in order to coexist with a legacy LTE UE and to avoid an additional BD increase for an added DCI format size caused by a use of the CIF. If a plurality of the CCs are aggregated, the USS is configured according to the CCs. Meanwhile, a payload size of a specific DCI format (for clarity, DCI format A) where a CIF is not configured in the CSS may be identical to a payload size of a specific DCI format (for clarity, DCI format B) where a CIF is configured in the USS in size on a single CC (e.g., DL PCC). In this case, the payload size of the DCI format may or may not include a CRC size according to a definition and may be simply called a DCI format size. The payload size of the DCI format may vary depending on a frequency band of a CC. The DCI format A and the DCI format B may be identical to each other or may be different from each other. For clarity, the aforementioned DCI format A/B is called a same size DCI format between SSs, simply called a same size DCI format or a same size DCI. The DCI format A and the DCI format B include a field configuration (e.g., CIF) different from each other. Preferably, the present invention may be limited to a case that the same size DCI formats are CRC-masked (scrambled) using an identical RNTI (e.g., C-RNTI). Meanwhile, if the CSS and the USS overlap each other and a user equipment succeeds in decoding the same size DCI format in an overlapped region, the user equipment may not recognize whether a detected PDCCH is received from the CSS or the USS, i.e., whether it is PDCCH including a CIF or PDCCH not including a CIF (situation #1).

In LTE-A, if a single CC is assigned or a non-cross-CC scheduling operation is applied in a situation that a plurality of CCs are aggregated, a method of not using a CIF for both PDCCH transmitted via the USS and PDCCH transmitted via the CSS is considered. In this case, due to a non-periodical SRS request field configuration according to each CC, a non-periodical CSI request field configuration in a CC aggregation situation, or a different reason, a payload size of a specific DCI format (for clarity, DCI format C) where a CIF is not configured in the CSS may be identical to a payload size of a specific DCI format (for clarity, DCI format D) where a CIF is not configured in the USS in size on a single CC (e.g., DL PCC). The DCI format C/D can be configured as fields within the DCI formats are different from each other while a total payload size is identical to each other. Or, an identical field may have a size different from each other. Similar to the previous description, the DCI format C/D can be called a same size DCI format between SSs, simply called a same size DCI format or a same size DCI. Preferably, the present invention may be limited to a case that the same size DCI formats are CRC-masked (scrambled) using an identical RNTI. Meanwhile, if the CSS and the USS overlap each other and a user equipment succeeds in decoding the same size DCI format in an overlapped region, the user equipment may not recognize whether a detected PDCCH is received from the CSS or the USS. In particular, the user equipment may not precisely recognize a field configuration and a field size of the DCI format transmitted on the PDCCH (situation #2).

In particular, if a single CC or a plurality of CCs are configured, confusion may occur between the DCI format (hereinafter CSS-DCI) configured in the CSS and the DCI format (hereinafter USS-DCI) configured in the USS in terms of the user equipment. In the following description, a method of solving the aforementioned problem is proposed. For instance, the method according to the present invention includes a method of assigning a control channel and a method of processing the control channel.

As a method of solving a problem of the aforementioned situation #1/#2 at once, if the CSS and the USS are configured on a single CC and the CSS-DCI and the USS-DCI are configured in a manner that fields in each of the DCI formats are differently configured or a field identical to each other has a size different from each other while a total payload size is identical, the present invention proposes that the only CSS-DCI is transmitted/received at least in a region where the CSS and the USS overlaps among the DCI formats having identical payload size. In this case, a field configuration/a field size of the CSS-DCI and that of the USS-DCI may be different from each other due to a CIF field, a non-periodical SRS request field, or a non-periodical CSI request field. The present method may be limited to a case that the CSS-DCI and the USS-DCI are CRC-masked (scrambled) using an identical RNTI (e.g., C-RNTI, SPS-RNTI). And, the present method can make the whole region where the CSS and the USS overlap each other permit/recognize the CSS-DCI transmission only. Or, the present method can make the CSS-DCI transmission to be permitted or recognized only when a PDCCH candidate for the CSS-DCI and a PDCCH candidate for the USS-DCI are configured with an identical start CCE in the overlapped region.

According to the present method, a user equipment recognizes a DCI format detected on an overlap timing (e.g., subframe n) in the overlapped region as the CSS-DCI for the identical payload size DCI formats. As an equivalent process, in case that the user equipment monitors the DCI formats having an identical payload size in the CSS and the USS, the user equipment may assume that the CSS-DCI is transmitted only in the overlapped region. A high priority is given to the CSS-DCI. This is because, since a field configuring the CSS-DCI does not change before and after an RRC reconfiguration, an UE error caused by overlapping the CSS and the USS can be avoided in an RRC reconfiguration (e.g., CIF reconfiguration, non-periodical SRS reconfiguration, CC aggregation reconfiguration) period.

Figure 10:
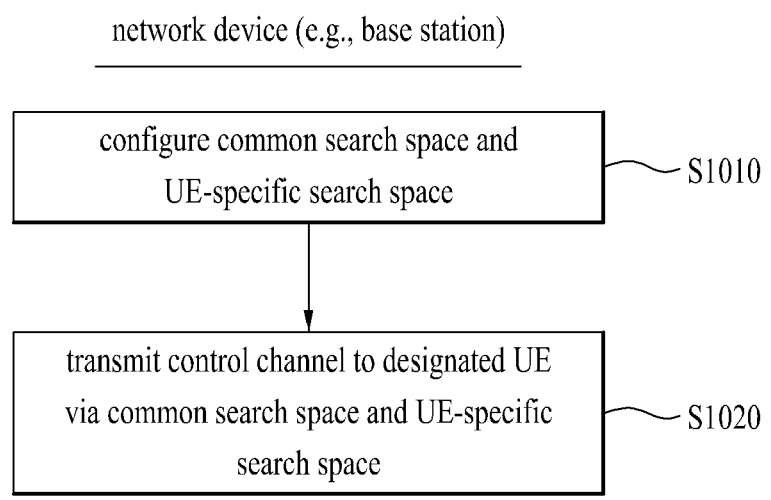
FIG. 10 to FIG. 13 are diagrams for methods of eliminating ambiguity in case that a control channel is received according to embodiments of the present invention.

FIG. 10 is a flowchart indicating an example that a network device (e.g., a base station) transmits a control channel.

Referring to FIG. 10, a base station configures a CSS and one or more USSs [S1010]. Each of the SSs includes a control channel candidate set and the USS is configured according to a CC. The SS can be configured by a process of determining a control channel assignment. A control channel includes PDCCH and a control channel candidate includes a PDCCH candidate. An SS size (e.g., the number of CCE), CCE aggregation level of the PDCCH candidate, a position of the SS, and the like can be determined by the process of determining a control channel assignment. The CSS and the USS may overlap each other. According to the present example, assume that the CSS-DCI and the USS-DCI have an identical payload size and fields within each of the DCI formats are differently configured or have a size different from each other for an identical field. One control information format per DL CC or UL CC can be configured for an SS. Or, two control information formats per DL CC or UL CC may be configured for an SS. Such a DL/UL common control information format as a DCI format 0/1A of LTE can be configured for an SS. An SS configuration scheme may follow a PDCCH SS configuration scheme of a legacy LTE. Yet, parameters regarding an SS according to CC (e.g., a hashing pattern, a position, a size, and the like) can be obtained in a manner of combining parameters regarding a PDCCH SS of the legacy LTE with a CIF value.

Subsequently, a base station transmits a control channel for a specific UE via at least one of the CSS and one or more USSs [S1020]. According to the present example, the CSS and the one or more USSs are transmitted via a control region of an identical subframe on an identical DL CC (e.g., DL PCC). Specifically, the CSS and the one or more USSs are transmitted via the control region (i.e., maximum 3 (4) contiguous OFDM symbols designated by PCFICH) (refer to FIG. 3) in a subframe. A control channel (or control information) can carry identification information to indicate a corresponding UE. The identification information includes RNTI, for instance, C-RNTI, SPS-RNTI, and the like. The control channel (or control information) can be scrambled using the identification information. For instance, a base station can transmit PDCCH, which is CRC-scrambled with C-RNTI, to a UE. In the present example, assume that the control channels transmitted from the CSS and the USS are scrambled with an identical RNTI.

Meanwhile, there may exist a case of a control channel (or control information) confusion between the CSS and the USS. The case of control channel confusion includes a case that the CSS and the USS overlap each other. And, the case of control channel confusion includes a case that control channel candidates situating in the CSS and the USS have an identical DCI format size (in other word, a DCI payload size). Preferably, it may be limited to a case that the control channel candidates situating in the CSS and the USS have an identical identifier (e.g., RNTI) and/or an identical first CCE resource. In this case, according to the present method, the USS may be restricted to transmit a control channel (or DCI) in at least a part of the control channel candidates.

For instance, if there is a chance of confusion of a control channel between the CSS and the USS, transmission of the control channel (or DCI) may be dropped on the at least a part of the control channel candidates of the USS. A region where a control channel (or DCI) transmission is restricted may correspond to the whole of the USS, an overlapped region in the USS, or a part of the overlapped region (or, a control channel resource corresponding to the aforementioned regions (e.g., CCE)). According to an embodiment, transmission restriction of a control channel (or DCI) is performed in a process that a control channel resource is allocated to a DCI or is performed in a step of actually transmitting a control channel (or DCI). And, according to an embodiment, the transmission restriction of a control channel (or DCI) can be performed by a puncturing (or nulling) (a sort of rate matching) before a resource mapping or a puncturing (or nulling) after a resource mapping. In summary, restricting a transmission of a control channel (or DCI) in the present method may correspond to a case that control channel candidates monitored in the CSS and the USS are configured to have an identical DCI format size or, preferably, configured to have an identical identifier (e.g., RNTI) and/or an identical start resource (e.g., a start CCE).

Figure 11:
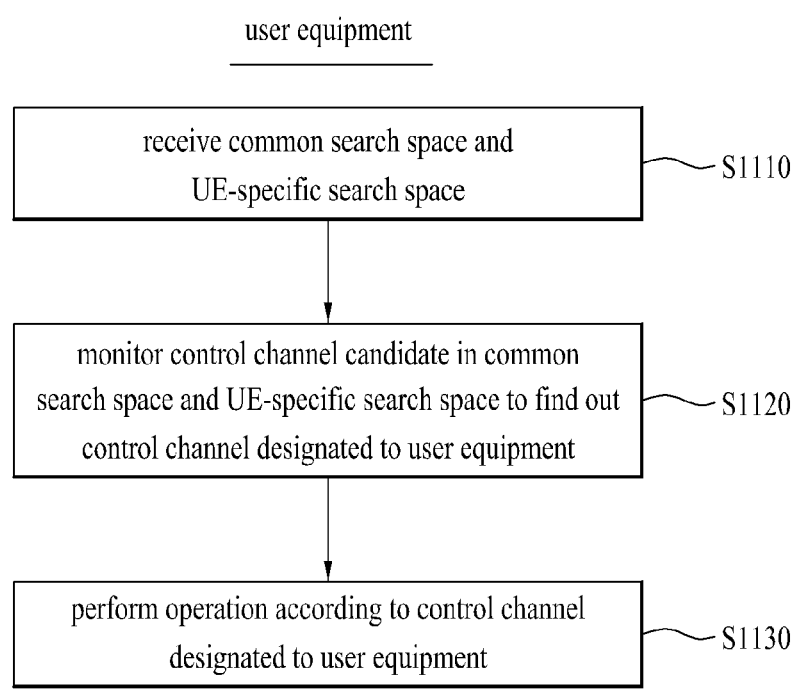

FIG. 11 is a flowchart indicating an example that a user equipment processes a control channel (e.g., PDCCH). Since the steps of FIG. 11 correspond to the steps of FIG. 10, for the detailed explanation, it may refer to the contents of FIG. 10.

Referring to FIG. 11, a user equipment receives a subframe including a control region [S1110]. The control region receives a CSS and one or more USSs. Each of the CSS and the USS includes a control channel candidate set, respectively. In the present example, assume that a payload size of the CSS-DCI and a payload size of the USS-DCI are identical to each other, fields within each of the DCI formats are differently configured, or the CSS-DCI and the USS-DCI have a size different from each other for an identical field. Subsequently, the user equipment performs a process of determining a control channel (e.g., PDCCH) assignment to find out a control channel designated to the user equipment [S1120]. The process of determining a control channel assignment includes a process of monitoring control channel candidates within an SS in consideration of an SS size (e.g., the number of CCEs) obtained by a predetermined rule, a CCE aggregation level of a control channel candidate, an SS position, and the like. The monitoring process includes a blind detection detecting each of the control channel candidates. Subsequently, the user equipment can perform an operation (e.g., PDSCH reception, PUSCH transmission, transmit power control, and the like) in accordance with the control channel designated to the user equipment [S1130].

Meanwhile, there may exist a case of a control channel (or control information) confusion between the CSS and the USS. The case of control channel confusion includes a case that the CSS and the USS overlap each other. And, the case of control channel confusion includes a case that control channel candidates situating in the CSS and the USS have an identical DCI format size (in other word, a DCI payload size). Preferably, it may be limited to a case that the control channel candidates situating in the CSS and the USS have an identical identifier (e.g., RNTI) and/or an identical first CCE resource. In this case, the present method assumes that a user equipment is restricted to transmit a control channel (or DCI) in at least a part of control channel candidates in the USS. Under this assumption, the user equipment can perform the process of determining a control channel assignment, more specifically, the process of monitoring. In other word, the user equipment can perform the process of monitoring under an assumption that a control channel (or DCI) can be transmitted in the CSS only in a region where a control channel (or DCI) transmission is restricted. The region where a control channel (or DCI) transmission is restricted may correspond to the whole of the USS, an overlapped region in the USS, or a part of the overlapped region (or, a control channel resource corresponding to the aforementioned regions (e.g., CCE)). In summary, restricting a transmission of a control channel (or DCI) in the present method may correspond to a case that control channel candidates monitored in the CSS and the USS are configured to have an identical DCI format size or, preferably, configured to have an identical identifier (e.g., RNTI) and/or an identical start resource (e.g., a start CCE).

According to the present method, the user equipment can search the CSS-DCI only in the region where a control channel (or DCI) transmission is restricted depending on an embodiment. For instance, the user equipment can search only one format among DCI formats of an identical size in a specific SS region on a specific timing point. In other word, in case that the DCI formats respectively configured in two SSs are identical in size, the user equipment may not perform monitoring/BD for the DCI format of the identical size configured in the USS in the specific SS region on the specific timing point. According to an embodiment, after monitoring both the CSS and the USS according to a conventional procedure, if a control channel (e.g., PDCCH) is detected in the region where the control channel (or DCI) transmission is restricted, the user equipment may consider that the PDCCH is received in the CSS.

Transmission of a same size DCI format can be restricted in the USS as follows.

1) When overlap occurs between two SSs, restriction is applied to an overlapped USS region only.

Figure 12A:
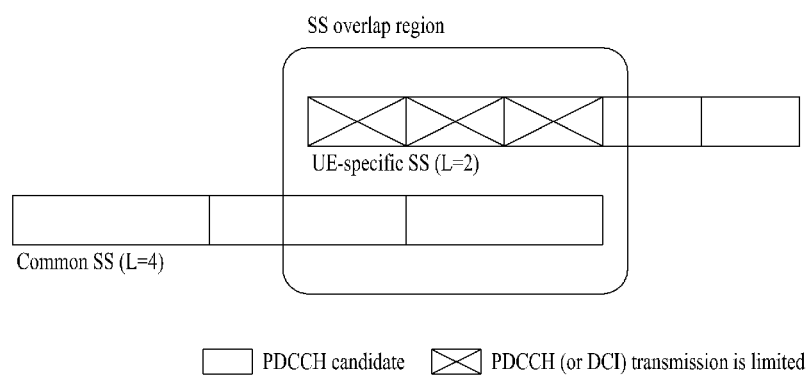

A base station does not transmit USS-DCI on a timing point that overlap occurs between the CSS and the USS only and in an overlapped region only. FIG. 12a shows an SS configuration according to the present method. Hence, a user equipment considers that a control channel is transmitted via the CSS only in the overlapped region. In particular, if a control channel is detected in the overlapped region, the user equipment can consider that the control channel is received in the CSS. According to embodiment, for the same size DCI formats on a corresponding timing point, the user equipment can respectively receive/decode (BD) the CSS-DCI in the overlapped region and the USS-DCI in the USS except the overlapped region. In particular, the user equipment may not monitor a control channel candidate for the USS-DCI in the overlapped region. As a different method, while monitoring both a control channel candidate for the CSS-DCI and a control channel candidate for the USS-DCI in the overlapped region, if a control channel is detected, the user equipment regards it as the CSS-DCI. The present method can minimize the decrease of scheduling flexibility in the USS by enabling USS-DCI assignment in the USS except the overlapped region.

Figure 12B:
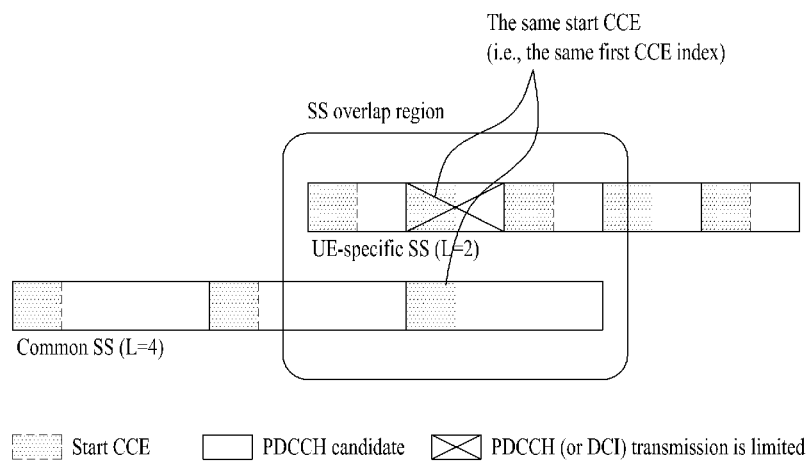
Figure 13:
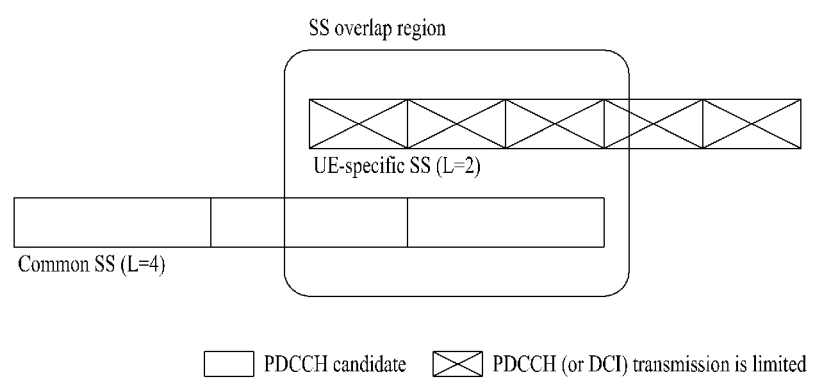

Preferably, the present method can restrict a control channel to be transmitted in the USS when both the control channel candidate of the CSS and the control channel candidate of the USS have a same DCI (payload) size, a same RNTI (e.g., CRC-scrambled), and are configured by a same start resource (e.g., CCE) only. FIG. 12b shows an SS configuration according to the present method.

2) When overlap occurs between two SSs, restriction is applied to the whole USS region.

A base station does not transmit USS-DCI for the whole USS region on a timing point that overlap occurs between the CSS and the USS only. Hence, a user equipment considers that a control channel is transmitted via the CSS only in the overlapped region. In particular, if a control channel is detected in the overlapped region, the user equipment can consider that the control channel is received in the CSS. According to embodiment, the user equipment cannot receive/decode (BD) the CSS-DCI in the whole USS and can receive/decode (BD) the CSS-DCI only in the overlapped region for the same size DCI formats on a corresponding timing point. As a different method, while monitoring both a control channel candidate for the CSS-DCI and a control channel candidate for the USS-DCI in the overlapped region, if a control channel is detected, the user equipment regards it as the CSS-DCI. In case of the present method, although scheduling flexibility is additionally decreased in the USS, complexity of distinguishing the overlapped region from a not-overlapped region may be reduced.

Preferably, the present method can restrict a control channel to be transmitted in the whole USS if a control channel candidate, which includes a same DCI (payload) size, a same RNTI (e.g., CRC-scrambled), and a same start resource (e.g., CCE) in the CSS and the USS, is configured to be monitored only.

As a method limited to the situation #2, in a situation of a non-cross-CC scheduling not using a CIF, for both the CSS and the USS configured on a single CC, while a payload size of the CSS-DCI and a payload size of the USS-DCI are identical to each other, if fields within the DCI formats are differently configured or have a size different from each other for an identical field, the present invention proposes a method of identically reconfiguring a CSS-DCI field to a USS-DCI field. In particular, if the aforementioned condition is satisfied, it is able to permit the CSS-DCI to perform a non-periodical SRS request and a non-periodical CSI request for a plurality of CCs. As a different method, if the aforementioned condition is satisfied, the present invention proposes a method of setting all values of specific fields (e.g., a non-periodical SRS request field, a non-periodical CSI request field, a flag field indicating whether a non-contiguous PUSCH resource is allocated, and the like), which are capable of occurring ambiguity between the CSS-DCI and the USS-DCI in a overlapped region of the CSS and the USS, to 0 (i.e., disables function of corresponding fields) or ignoring the corresponding fields. The aforementioned two types of methods can be limitedly applied only when a control channel candidate (e.g., PDCCH candidate) having DCI formats of an identical size is configured to have an identical RNTI (e.g., C-RNTI) (a CRC masked (or scrambled) with RNTI) and/or an identical start resource (e.g., a start CCE).

In a 3GPP LTE/LTE-A system, as mentioned in FIG. 3, an FDD DL carrier and a TDD DL subframes use first n OFDM symbol of a subframe to transmit PDCCH, PHICH, PCFICH or the like, which is a physical channel used for transmitting various control informations and use the rest of OFDM symbols to transmit PDSCH. The number of symbols used for transmitting a control channel in each subframe is dynamically delivered to a user equipment via such a physical channel as PCFICH and the like or semi-statically delivered via an RRC signaling. The n value can be set from 1 symbol to maximum 4 symbols according to subframe property and system property (FDD/TDD, system bandwidth, etc.). Meanwhile, a physical downlink control channel (PDCCH) used for transmitting DL/UL scheduling and various kinds of control informations is transmitted via a limited OFDM symbol in a legacy LTE system. Hence, an introduction of an enhanced PDCCH (E-PDCCH), which is multiplexed with PDSCH more freely in a manner of using FDM/TDM method, is under consideration.

Figure 14:
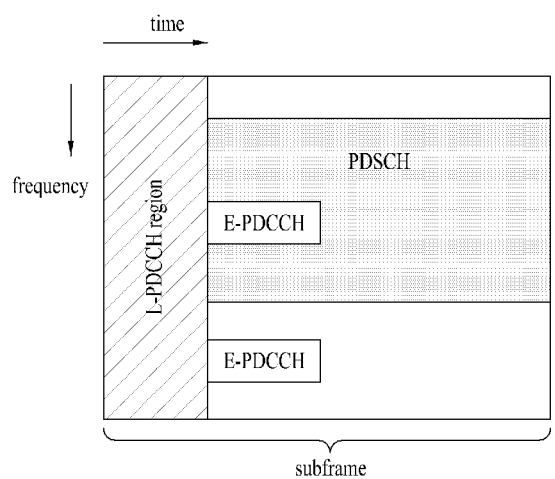
FIG. 14 indicates an example that PDCCH is assigned to a data region of a subframe.

FIG. 14 indicates an example that PDCCH is assigned to a data region of a subframe.

Referring to FIG. 14, PDCCH (for clarity, a legacy PDCCH) according to a legacy LTE/LTE-A system can be assigned to a control region (refer to FIG. 3) in a subframe. L-PDCCH region in the drawing means a region to which the legacy PDCCH is able to be assigned thereto. According to the context, the L-PDCCH region may mean a control region, a control channel resource region (i.e., CCE resource) capable of practically being assigned the PDCCH within the control region, or a PDCCH search space. Meanwhile, the PDCCH can be additionally assigned to a data region (e.g., a resource region for PDSCH, refer to FIG. 3). The PDCCH assigned to the data region is called an E-PDCCH. Although the drawing shows a case that one E-PDCCH exists in one slot, this is an exemplary only. The E-PDCCH may exist by a subframe unit (i.e., through two slots).

In the following description, a method of allocating and managing a resource for a DL control channel using a data region (e.g., PDSCH) in a subframe is described with reference to the drawings. For clarity, although the following description is described centering on a relationship between a base station and a user equipment, the present invention may be able to identically/similarly apply to the relationship between a base station and a relay or the relationship between a relay and a user equipment as well. Hence, the relationship between the base station and the UE can be replaced by the relationship between the base station and the relay or the relationship between the relay and the UE in the following description. In terms of receiving a signal, the relay and the UE can be generalized as a receiving stage. In case that the relay operates as a receiving stage, the E-PDCCH can be replaced by an R-PDCCH (relay-PDCCH).

First of all, E-PDCCH is explained in more detail. The E-PDCCH carries a DCI. For instance, the E-PDCCH may be able to carry DL/UL scheduling information. The processes of E-PDCCH/PDSCH and E-PDCCH/PUSCH are identical/similar to a process according to L-PDCCH. In particular, a user equipment receives an E-PDCCH and may be then able to receive data/control information via a PDSCH corresponding to the E-PDCCH. And, the user equipment receives the E-PDCCH and may be then able to transmit the data/control information via the PUSCH corresponding to the E-PDCCH. An E-PDCCH transmission processing (e.g., channel coding, interleaving, multiplexing, and the like) can be performed using the process (refer to FIGS. 4 to 5) defined by the legacy LTE within an available scope and can be modified if necessary.

Meanwhile, according to the legacy LTE system, the legacy LTE reserves a PDCCH candidate region (PDCCH search space) within a control region in advance and transmits a PDCCH of a specific user equipment to a part of the reserved region. Hence, the user equipment may be able to obtain the PDCCH of its own in the PDCCH search space via a blind decoding. Similarly, the E-PDCCH can be transmitted through a part or a whole of pre-reserved resources.

Figure 15:
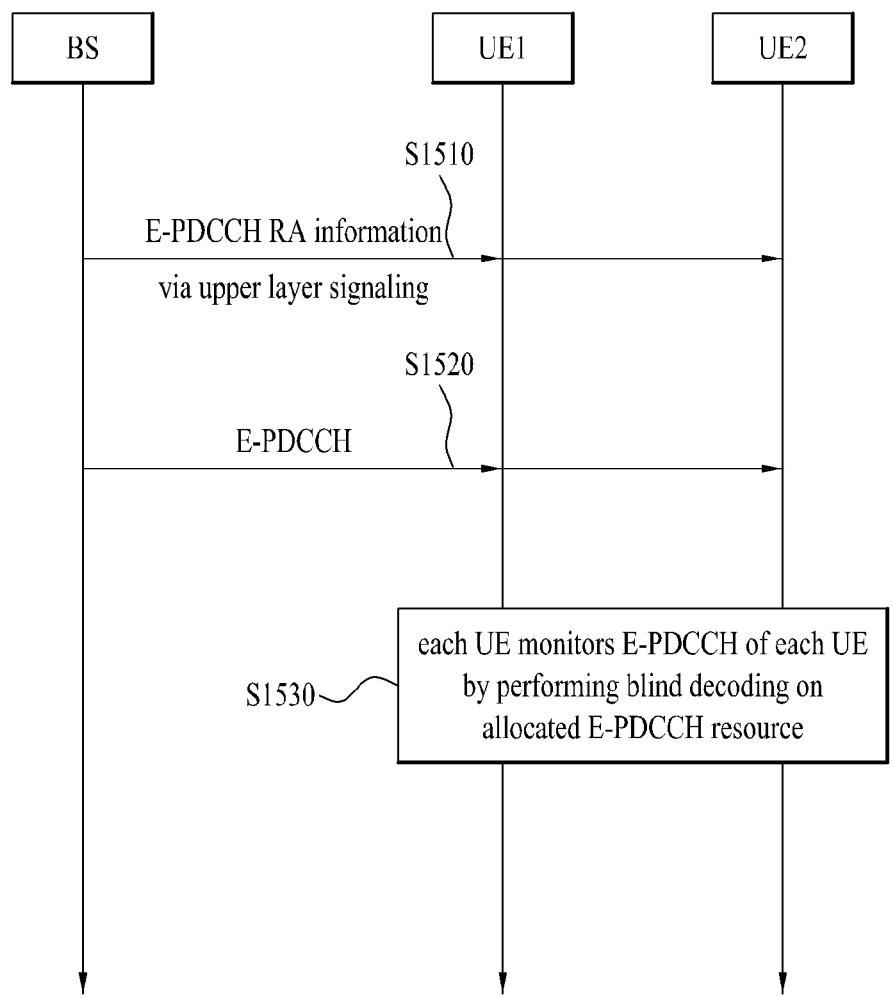
FIG. 15 is a diagram for an example of E-PDCCH (enhanced PDCCH) and PDSCH reception process.

FIG. 15 is a diagram for an example of resource allocation for E-PDCCH (enhanced PDCCH) and PDSCH reception process.

Referring to FIG. 15, a base station transmits E-PDCCH resource allocation (RA) information to a user equipment [S1510]. The E-PDCCH RA information may include RB (or VRB (virtual resource block)) allocation information. The RB allocation information can be provided by an RB unit or an RBG (resource block group) unit. The RBG includes 2 or more contiguous RBs. The E-PDCCH RA information can be transmitted using an upper layer (e.g., RRC) signaling. In this case, the E-PDCCH RA information is used to pre-reserve an E-PDCCH resource (region). Subsequently, the base station transmits the E-PDCCH to the user equipment [S1520]. The E-PDCCH can be transmitted within a part or a whole of the region of the E-PDCCH resource (e.g., M number of RB) reserved in the step S1510. Hence, the user equipment monitors a resource (region) (hereinafter an E-PDCCH search space, simply an SS) to which the E-PDCCH is able to be transmitted thereto [S1530]. The E-PDCCH SS can be provided as a part of the RB set assigned in the step S1510. In this case, a monitoring may include a blind decoding for a plurality of E-PDCCH candidates within the SS.

In case that the E-PDCCH is introduced, a PDCCH SS (i.e., the CSS and the USS) to detect a control channel can be managed by 3 kinds of schemes as follows according to a control overhead and/or L-PDCCH interference, and the like. FIG. 16 shows the schemes in the following.

Case 0: both the CSS and the USS are configured in an L-PDCCH region

Case 1: the CSS is configured in an L-PDCCH region and the USS is configured in an E-PDCCH region Case 2: both the CSS and the USS are configured in an E-PDCCH region The case 0 is a conventional operation and may be appropriated when both a control overhead and L-PDCCH interference impact are relatively small. The case 1 may be useful for a case that the L-PDCCH interference is small and the control overhead is big or a purpose that transmission performance for a UE-specific PDCCH is enhanced by managing multi-antenna transmission and/or a UE-specific DMRS (demodulation reference signal) for example. The case 2 may be suitable for a case that the L-PDCCH interference impact and/or the control overhead are relatively big. According to the case 0/2, since both the CSS and the USS are transmitted in an identical resource region (i.e., the L-PDCCH region or the E-PDCCH region), there may exist a control channel confusion problem due to the overlap of the CSS and the USS. In this case, in case of the case 0, the control channel confusion problem can be solved in a manner of using the method explained with reference to FIG. 10 to FIG. 13.

In the following description, a method of solving the control channel confusion problem is proposed in case of the case 2. Since a basic proposal is similar to the method explained with reference to FIG. 10 to FIG. 13, for the details, it may refer to the contents described in FIG. 10 to FIG. 13.

In case of the case 2, if both the CSS and the USS for a user equipment are configured in an E-PDCCH region on a single CC, while a payload size of the CSS-DCI and a payload size of the USS-DCI are identical to each other, if fields within the DCI formats are differently configured or have a size different from each other for an identical field, the present invention proposes a method that the CSS-DCI transmits/receives only among the DCI formats having an identical payload size in at least a region where the CSS and the USS overlap each other. In this case, a field configuration/a field size of the DCI information of the CSS-DCI and that of the USS-DCI may be different from each other due to a CIF field, a non-periodical SRS request field, or a non-periodic CSI request field. The present method may be limited to a case that the CSS-DCI (or a PDCCH candidate for the CSS-DCI) and the USS-DCI (or a PDCCH candidate for the CSS-DCI) are CRC-masked (scrambled) using an identical RNTI (e.g., C-RNTI, SPS-RNTI). And, the present method can make the whole region where the CSS and the USS overlap each other permit/recognize the CSS-DCI transmission only. Or, the present method can make the CSS-DCI transmission to be permitted or recognized only when both a PDCCH candidate for the CSS-DCI and a PDCCH candidate for the USS-DCI are configured with an identical start CCE (or a minimum control channel resource unit (specifically designed for E-PDCCH) corresponding to the start CCE) in the overlapped region.

Unlike the method explained with reference to FIG. 10 to FIG. 13, the method of solving confusion for E-PDCCH can additionally consider a CCE (or a minimum control channel resource unit (specifically designed for E-PDCCH) corresponding to the CCE) aggregation level. In case of a legacy L-PDCCH, since a DCI codeword of a repeating form is mapped to the CCE due to a circular buffer attribute of a base station, a user equipment may detect a corresponding DCI in a CCE aggregation level lower than the actual CCE aggregation level when a blind detection is performed. Consequently, the user equipment is unable to know the actual CCE aggregation level applied to a DCI. In case of the L-PDCCH, since the user equipment just receives PDCCH indicated by a corresponding SS to the user equipment, such a problem as resource waste does not occur although the user equipment does not precisely know the actual CCE aggregation level. Yet, in case of the E-PDCCH, since E-PDCCH and PDSCH for an identical user equipment can be multiplexed together in a data region, if the user equipment does not precisely know an actual resource aggregation level (e.g., CCE aggregation level) of the E-PDCCH, there may exist a wasted resource in a manner of being not used as E-PDCCH or PDSCH. In particular, if both E-PDCCH and PDSCH for a user equipment are multiplexed in an identical RB or an RB pair, unclear CCE aggregation level may cause an error in a PDSCH decoding process.

Hence, in case of introducing an E-PDCCH structure, it may be able to consider a method of appropriately mapping a DCI codeword in a manner that a result of coding/decoding for an identical DCI codeword is matched with each other between a user equipment and a base station in terms of a CCE aggregation level to maximize resource use efficiency of a legacy data region. By doing so, the user equipment properly recognizes the CCE aggregation level of a DCI and can precisely classify a scheduled/transmitted E-PDCCH and PDSCH (in particular, in case that both E-PDCCH and PDSCH for the user equipment are multiplexed in an identical RB or an RB pair).

As mentioned in the foregoing description, when a CCE aggregation level of a detected DCI can be identified by a user equipment, if the CCE aggregation level of the CSS-DCI and that of the USS-DCI are different from each other, channel confusion may not occur.

FIG. 17 is a diagram for an example that control channel confusion does not occur in E-PDCCH (enhanced physical downlink control channel) region. FIG. 17(*a*) shows an example that a PDCCH candidate for the CSS-DCI and a PDCCH candidate for the USS-DCI are configured with an identical start CCE (or a minimum control channel resource unit (specifically designed for E-PDCCH) corresponding to the CCE) in an overlapped region. Yet, since the CSS corresponds to a CCE aggregation level 4 (L=4) and the USS corresponds to a CCE aggregation level 2, control channel confusion does not occur in a region where the CSS and the USS overlap each other. On the contrary, FIG. 17(*b*) shows an example that a CCE aggregation level of the CSS and that of the USS are identical to each other (L=4). Yet, since the PDCCH candidate for the CSS-DCI and the PDCCH candidate for the USS-DCI have a start CCE different from each other in the overlapped region, the CSS-DCI and the USS-DCI are not confused in the overlapped region.

Figure 18:
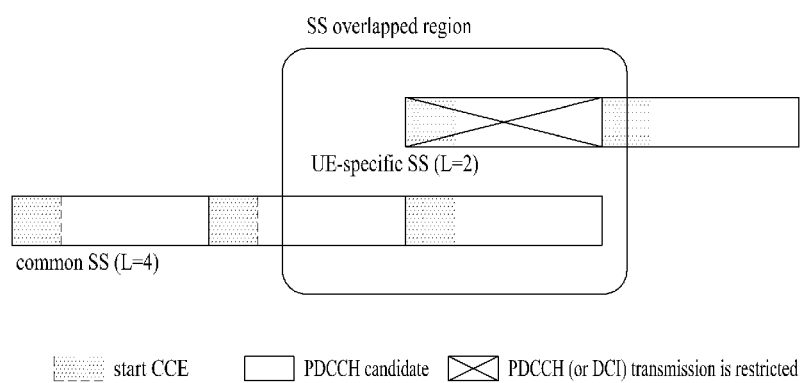
FIG. 18 is a diagram of an example of a method of eliminating ambiguity in case of receiving a control channel according to one embodiment of the present invention.

Hence, if a user equipment can clearly identify a CCE aggregation level of a DCI, a method of solving E-PDCCH confusion problem can be additionally applied when a CCE aggregation level of the PDCCH candidate for the CSS-DCI and a CCE aggregation level of the E-PDCCH candidate for the USS-DCI are identical to each other. FIG. 18 shows an example of a process that a control channel is transmitted and received according to the present method. Referring to FIG. 18, for instance, if both the CSS and the USS for an identical user equipment are configured in an E-PDCCH region on an identical CC (e.g., DL PCC), an E-PDCCH candidate satisfying following conditions can be transmitted and received via the CSS only. Equivalently, if a user equipment is configured to monitor an E-PDCCH candidate satisfying following conditions in the CSS and the USS, the user equipment can perform an E-PDCCH reception operation (e.g., monitoring) under an assumption that the E-PDCCH candidate is received via the CSS only.

E-PDCCH candidates having an identical payload size

E-PDCCH candidates where a CRC is masked (scrambled) with an identical RNTI (e.g., C-RNTI, SPC-RNTI)

E-PDCCH candidates having an identical start CCE (or, a minimum control channel resource unit (specifically designed for E-PDCCH) corresponding to the start CCE)

E-PDCCH candidates having an identical CCE (or, a minimum control channel resource unit (specifically designed for E-PDCCH) corresponding to the start CCE) aggregation level According to the present method, a user equipment recognizes a DCI format detected in a overlapped region as the CSS-DCI for the same size payload DCI formats on an overlapped timing point (e.g., a subframe n). As an equivalent process, if a user equipment monitors a DCI format having a same payload size in the CSS and the USS, it is able to assume that the CSS-DCI is transmitted only in the overlapped region. A high priority is given to the CSS-DCI. This is because, since a field configuring the CSS-DCI does not change before and after an RRC reconfiguration, an UE error caused by the overlap between the CSS and the USS can be avoided in an RRC reconfiguration (e.g., CIF reconfiguration, non-periodical SRS reconfiguration, CC aggregation reconfiguration) period.

While the aforementioned explanation is described under an assumption that a CCE aggregation level is classified for E-PDCCH, it may be preferable that the CCE aggregation level is classified for L-PDCCH as well. Hence, if the CCE aggregation level for the L-PDCCH is clearly identified by the user equipment, the CCE aggregation level can be additionally considered for the method of solving a control channel confusion problem described in FIG. 10 to FIG. 13.

Figure 19:
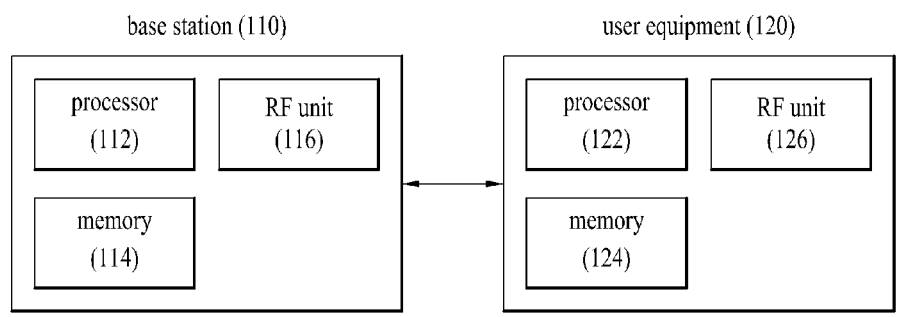
FIG. 19 is a diagram for an example of a base station and a user equipment to which one embodiment of the present invention is applicable.

FIG. 19 is a diagram for an example of a base station and a user equipment to which one embodiment of the present invention is applicable.

Referring to FIG. 19, a wireless communication system includes a base station (BS) 110 and a user equipment (UE) 120. The base station 110 includes a processor 112, a memory 114, and a RF (radio frequency) unit 116. The processor 112 is configured to implement a procedure and/or methods proposed by the present invention. The memory 114 is connected with the processor 112 and stores various informations to drive the processor 112. The RF unit 116 is connected with the processor 112 and is configured to transmit/receive a radio signal. The user equipment 120 includes a processor 122, a memory 124, and a RF (radio frequency) unit 126. The processor 122 is configured to implement a procedure and/or methods proposed by the present invention. The memory 124 is connected with the processor 122 and stores various informations to drive the processor 122. The RF unit 126 is connected with the processor 122 and is configured to transmit/receive a radio signal. The base station 110 and/or the user equipment 120 may have a single antenna or multiple antennas.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, embodiments of the present invention are mainly explained centering on a data transmission and reception between a user equipment and a base station. A specific operation explained as performed by a base station may be performed by an upper node of the base station in some cases. In particular, in a network constructed with a plurality of network nodes including a base station, it is apparent that various operations performed for communication with a user equipment can be performed by the base station or other networks except the base station. 'Base station (BS)' may be substituted with such a terminology as a fixed station, a Node B, an eNode B (eNB), an access point (AP) and the like. And, a terminal may be substituted with such a terminology as a user equipment (UE), a mobile station (MS), a mobile station subscriber station (MSS), and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Industrial Applicability

The present invention can be used for such a wireless communication device as a user equipment, a relay, a base station, and the like.

What is claimed is:

1. A method of performing a process of determining a control channel assignment for a control channel, by a user equipment for which a carrier indicator field is configured in a wireless communication system, the method comprising:

monitoring a common search space containing a control channel candidate set for the control channel on a specific carrier; and monitoring a user equipment-specific search space containing the control channel candidate set for the control channel on the specific carrier, wherein if the user equipment is configured to monitor a plurality of control channel candidates having an identical radio network temporary identifier (RNTI), an identical information size, an identical first control channel resource, and different sets of downlink control channel information (DCI) fields in the common search space and the user equipment-specific search space, the plurality of control channel candidates are received in the common search space only.

2. The method of claim 1, wherein the control channel is received in the common search space only, for the plurality of the control channel candidates only.

3. The method of claim 1, wherein if the control channel is detected on the plurality of the control channel candidates, the control channel is considered to be received in the common search space.

4. The method of claim 1, wherein monitoring the plurality of the control channel candidates is performed under an assumption that the control channel is received in the common search space only.

5. The method of claim 1, wherein a cyclic redundancy check (CRC) is scrambled with the identical RNTI for the plurality of the control channel candidates.

6. The method of claim 1, wherein the information size corresponds to a DCI payload size.

7. The method of claim 1, wherein the control channel corresponds to a physical downlink control channel (PDCCH) and wherein the control channel candidates correspond to PDCCH candidates.

8. A user equipment for which a carrier indicator field is configured in a wireless communication system, comprising:
   a radio frequency (RF) unit; and
   a processor,
   the processor configured to monitor a common search space containing a control channel candidate set for the control channel on a specific carrier, the processor configured to monitor a user equipment-specific search space containing the control channel candidate set for the control channel on the specific carrier,
   wherein if the user equipment is configured to monitor a plurality of control channel candidates having an identical radio network temporary identifier (RNTI), an identical information size, an identical first control channel resource, and different sets of downlink control channel information (DCI) fields in the common search space and the user equipment-specific search space, the plurality of the control channel candidates are received in the common search space only.

9. The user equipment of claim 8, wherein the control channel is received in the common search space only, for the plurality of the control channel candidates only.

10. The user equipment of claim 8, wherein if the control channel is detected on the plurality of the control channel candidates, the control channel is received in the common search space.

11. The user equipment of claim 8, wherein monitoring the plurality of the control channel candidates is performed under an assumption that the control channel is received in the common search space only.

12. The user equipment of claim 8, wherein the plurality of the control channel candidates correspond to control channel candidates where a cyclic redundancy check (CRC) is scrambled with the identical RNTI.

13. The user equipment of claim 8, wherein the information size corresponds to a DCI payload size.

14. The user equipment of claim 8, wherein the control channel corresponds to a physical downlink control channel (PDCCH) and wherein the control channel candidates correspond to PDCCH candidates.

* * * * *